(No Model.)
W. H. BARR.
GLASS HOUSE POT OR TANK.
No. 528,710. Patented Nov. 6, 1894.
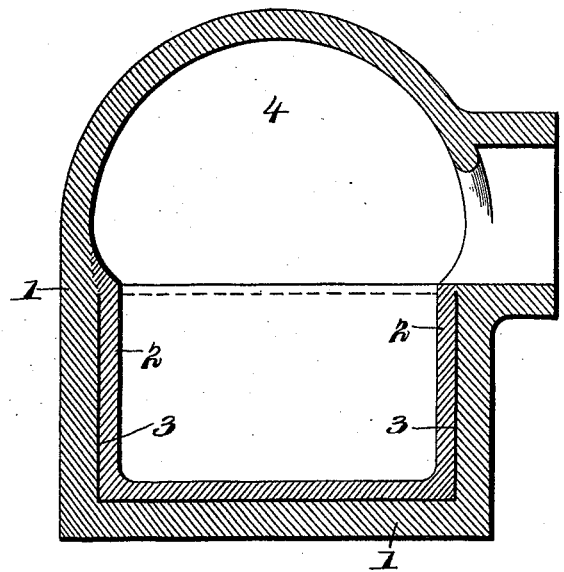
Witnesses
E. N. Stewart
Inventor
William H. Barr
By his Attorneys,
C. A. Snow & Co.

United States Patent Office.

WILLIAM H. BARR, OF TIFFIN, OHIO.

GLASS-HOUSE POT OR TANK.

SPECIFICATION forming part of Letters Patent No. 528,710, dated November 6, 1894.

Application filed October 11, 1892. Serial No. 448,596. (No model.)

*To all whom it may concern:*

Be it known that I, WILLIAM H. BARR, a citizen of the United States, residing in the city of Tiffin, Seneca county, Ohio, have invented certain new and useful Improvements in the Construction of Glass-House Pots or Tanks; and I do hereby declare that the following is a full, clear, and exact description of the improvement, which will enable others skilled in the art to which it appertains to make and use the same.

My invention relates to improvements in the construction of glass-melting pots or tanks; and it has for its object to provide means whereby the fractures due to inequalities and imperfections in the clay employed in the manufacture of the pot will be prevented from extending continuously from the inner to the outer surface of the pot.

It is the common practice to make glass melting pots with single walls of homogeneous material, and any flaw, occurring by reason of a lack of uniformity in the material or by reason of an imperfect molding of the same, starting at the inner surface of the wall is liable to extend to the outer surface and thus destroy the usefulness of the device. Such imperfections, both in the molding and in the quality of the material, are liable to occur, and hence the necessity for providing a construction whereby such imperfections, which appear at the inner surface, shall not continue to the outer surface, in order that openings or fractures at the inner surface may not be opposite similar openings in the outer portion of the structure.

My invention consists, in constructing the inner wall of a combination of domestic and foreign clays (said foreign clay being known as German clay), in which said foreign clay preponderates, and as this foreign clay is better adapted than the domestic clay to resist the action of the alkalies employed in fluxing, the risk of fracture is reduced. In other words, by constructing the pot with inner and outer concentric walls the materials of the two walls may be different, and that of the inner wall may be made to resist said action of the alkalies, while the outer wall may be constructed of a more refractory material, such as domestic clays in common use for this purpose.

My invention is more fully described hereinafter in connection with the accompanying drawing, and the novel features thereof are more particularly pointed out in the appended claims.

In the drawing,—the figure represents a vertical central section of a glass pot embodying my invention.

1 represents the outer wall of the pot, which is perferably made about two-thirds the thickness desired for the entire wall when completed, and 2 the inner concentric wall, which is molded within said outer wall and is spaced therefrom to form a small interval 3.

The construction of the bottom of the pot is identical with that of the sides, and the inner wall or lining extends to a point above the surface line of the glass when in the pot, or to a point substantially in the plane of the lower side of the glory-hole.

The manner of constructing the improved glass pot is substantially as follows:—The bottom of the outer wall is molded in the ordinary way and is made as above mentioned about two-thirds the desired thickness for the pot when completed, and after it has had time to partially dry and shrink slightly, a layer of sheets of separating material such as paper is arranged upon the upper surface of the bottom, and the bottom of the inner wall is molded thereon. The interposed sheets may be withdrawn after the shrinkage of the inner bottom has progressed slightly. The side walls are built up also about two-thirds the thickness of the completed wall to a height of about six inches. Then thin sheets of the separating material are arranged in contact with the inner surface of the outer wall. A corresponding height of the inner wall is built in contact with said interposed sheets, and after a slight shrinkage said sheets may be withdrawn. Then a second "working" of the outer wall is added, and so on until the inner wall has been extended above the plane of the surface line. Subsequently the outer wall is continued to form a dome 4. If the sheets of separating material, which are placed between the bottom of the outer wall and the bottom of the inner wall, are removed after the shrinkage of the inner bottom, it is obvious that said inner bottom will rest upon the inner surface of the outer bottom, but the separation of the two bottoms during construction will prevent the same from being united. It will thus be seen that any fracture occurring at the inner surface of the inner wall may extend to the outer surface of said inner wall but cannot cross the interval between the inner and outer walls for the reason that they are out of contact, being held so during the process of manufacture by the interposed sheets of paper, and any fracture occurring from the excessive heat applied to the outer surface of the outer wall may extend to the inner surface of said outer wall, but is there checked. As defects in the inner and outer walls are not liable to occur at corresponding or opposite points the liability of a fracture or opening extending through the two walls is not great, and hence the life of the melting-pot is protracted. Furthermore, by reason of the above described construction, the inner and outer walls may be made of materials which have different degrees of shrinkage, in that the shrinkage of one wall cannot affect the other wall, and hence the proportion of domestic and foreign clays which are used in the two walls may be varied to increase the refractory quality of the outer wall and the flux-resisting quality of the inner wall.

Having described my invention, what I claim is—

1. The herein-described melting-pot for glass, the same having an outer wall and bottom of refractory clay, and an inner wall and bottom of flux-resisting clay, said inner wall and bottom being spaced from the outer wall and bottom, substantially as specified.

2. The herein described melting-pot for glass, the same having an outer wall and bottom of refractory clay, an inner wall and bottom of flux-resisting clay, said inner wall and bottom being spaced from the outer wall and bottom, and separating-material, as paper, interposed between the contiguous surfaces of the inner and outer members, substantially as specified.

WILLIAM H. BARR.

Witnesses:
R. W. BROWN,
F. P. BOUSHEE.